US010330000B2

(12) United States Patent
Uibelhoer et al.

(10) Patent No.: US 10,330,000 B2
(45) Date of Patent: Jun. 25, 2019

(54) CONTROL DEVICE FOR AN EXHAUST GAS GUIDE SECTION OF A TURBINE

(71) Applicant: IHI CHARGING SYSTEMS INTERNATIONAL GMBH, Heidelberg (DE)

(72) Inventors: Thomas Uibelhoer, Obrigheim-Asbach (DE); Liudmila Khizhnyakova, Ennepetal (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 680 days.

(21) Appl. No.: 14/711,727

(22) Filed: May 13, 2015

(65) Prior Publication Data

US 2015/0292394 A1 Oct. 15, 2015

Related U.S. Application Data

(63) Continuation-in-part of application No. PCT/EP2013/003477, filed on Nov. 19, 2013.

(30) Foreign Application Priority Data

Nov. 29, 2012 (DE) .......................... 10 2012 111 558

(51) Int. Cl.
*F16K 1/36* (2006.01)
*F16K 25/04* (2006.01)
(Continued)

(52) U.S. Cl.
CPC ............ *F02B 37/183* (2013.01); *F04D 17/10* (2013.01); *F04D 27/009* (2013.01); *F16K 1/12* (2013.01);
(Continued)

(58) Field of Classification Search
None
See application file for complete search history.

(56) References Cited

U.S. PATENT DOCUMENTS 45,390 A * 12/1864 Cresson ................. F16K 25/04
251/210
579,171 A * 3/1897 Noyes ..................... B67D 7/42
137/445

(Continued)

FOREIGN PATENT DOCUMENTS

DE 11 2009 022 230 T5 9/2011
EP 2 444 626 4/2012
(Continued)

*Primary Examiner* — Kayla McCaffrey
(74) *Attorney, Agent, or Firm* — Klaus J. Bach

(57) ABSTRACT

In a control device for a flow-through exhaust gas guide section of a turbine for opening and closing a bypass duct to permit exhaust gas to bypass a turbine wheel arranged in a turbine wheel housing of the exhaust gas guide section comprising with an actuating device and a cover element being provided for opening or closing a flow cross-section of the bypass duct, the cover element is a hollow truncated cone with passages provided in the cone-shaped cover element which differ from one another so as to provide for a controllable efficient and quiet exhaust gas flow through the flow cross-section into the bypass duct.

5 Claims, 5 Drawing Sheets

(51) Int. Cl.
*F02B 37/18* (2006.01)
*F16K 1/12* (2006.01)
*F16K 31/52* (2006.01)
*F04D 17/10* (2006.01)
*F04D 27/00* (2006.01)
*F01D 25/30* (2006.01)

(52) U.S. Cl.
CPC ............... *F16K 1/36* (2013.01); *F16K 31/52* (2013.01); *F01D 25/30* (2013.01); *F05D 2220/40* (2013.01); *Y02T 10/144* (2013.01)

(56) References Cited

U.S. PATENT DOCUMENTS

| | | | | | |
|---|---|---|---|---|---|
| 4,475,494 | A | * | 10/1984 | Huther | F01L 3/02 |
| | | | | | 123/188.2 |
| 5,044,604 | A | * | 9/1991 | Topham | F16K 1/36 |
| | | | | | 251/120 |
| 2003/0188535 | A1 | | 10/2003 | Mader et al. | |

FOREIGN PATENT DOCUMENTS

| | | |
|---|---|---|
| GB | 2 156 045 A | 10/1985 |
| GB | 2 322 163 | 8/1998 |
| JP | 2005 226591 A | 8/2005 |

\* cited by examiner

CONTROL DEVICE FOR AN EXHAUST GAS GUIDE SECTION OF A TURBINE

This is a Continuation-In-Part application of pending international patent application PCT/EP2013/003477 filed 2013 Nov. 19 and claiming the priority of German patent application 10 2012 111 558.3 filed 2012 Nov. 29.

BACKGROUND OF THE INVENTION

The invention relates to a control device for an exhaust gas guide section of a turbine of an exhaust gas turbocharger with a control arrangement for opening and closing a turbine bypass duct.

Publication DE 11 2009 002 230 T5 shows a control device for an exhaust gas guide section of a turbine, in particular for a turbine of an exhaust gas turbocharger. The control arrangement is provided for opening and closing of a bypass duct in the flow-through exhaust gas guide section for bypassing a turbine wheel which is rotatably arranged in a turbine wheel chamber of the exhaust gas guide section. The control device comprises an actuating device and a cover element, with the actuating device being provided for moving the cover element. The cover element serves for opening or closing a flow cross-section of the bypass duct by means of a translatory motion of the cover element. With such a control device, it is possible to bypass the turbine wheel completely or partially under certain operating conditions of the exhaust gas turbocharger, in particular at operating conditions with large flow volumes, so that a more efficient operation of the exhaust gas turbocharger may be realized. In its simplest configuration, the cover element has e. g. the shape of a plate.

A basic problem with these control devices which are generally referred to as waste gates, is that flow disturbances and noise emissions occur upon opening or closing of the flow cross-section by means of the cover element, which noise emissions cannot necessarily be decoupled from flow disturbances. The term flow disturbances as used herein refers to deviation of the flow from a substantially uniform or linear flow. Such deviations may result both from the operation of a combustion engine which is usually connected with the exhaust gas turbocharger due to the pressure pulsations upon opening and closing of valves of the combustion engines or from opening of the flow cross-section due to a sudden release of the flow cross-section of the bypass duct.

The cover element performs an axial motion in the bypass duct, which is initiated by means of the actuating device. The cover element is usually not rigidly connected with the actuating device. If the cover element were rigidly connected with the actuating device this would mean that the actuating device itself is configured to perform an exclusively axial motion. Usually, the actuating device together with the cover element performs translatory and rotatory motions which can be effected by means of several articulated joints. Because articulated joints are not rigid connections, but are principally built with a certain degree of play, in particular flow-induced pulses acting on the control apparatus may produce noises such as e. g. rattling, which is caused by bumping of the cover element against a casing wall.

The publication shows a cover element which is concerned with the problem of exposure of the cover element to a non-linear or turbulent inlet flow. The cover element of the control device comprises a horn for influencing the flow, wherein the horn is formed as a three-dimensional extension of the cover element in a direction towards the exhaust gas flow. The horn is formed to generate a progressive unblocking of the flow cross-section upon opening.

It is the object of the present invention to provide a control device for an exhaust gas guide section of a turbine by means of which a reduction of noise emissions with a simultaneous compensation of a non-linear flow for the reduction of flow losses can be accomplished.

SUMMARY OF THE INVENTION

In a control device for a flow-through exhaust gas guide section of a turbine for opening and closing a bypass duct to permit exhaust gas to bypass a turbine wheel arranged in a turbine wheel housing of the exhaust gas guide section comprising with an actuating device and a cover element being provided for opening or closing a flow cross-section of the bypass duct, the cover element is a hollow truncated cone with passages provided in the cone-shaped cover element which differ from one another so as to provide for a controllable efficient and quiet exhaust gas flow through the flow cross-section into the bypass duct.

This means in other words that the cover element has an outer contour, which provides for a reduction in flow losses due to a non-linear flow upon opening of the flow cross-section. The flow cross-section may be changed in a continuous manner by means of the cone-shaped outer contour of the cover element when the flow cross-section is opened or closed. This means in other words that, at the beginning of the opening process, only a small cross-section of the flow cross-section is established, while, during opening of the flow cross-section, the flow cross-section continuously increases due to the cone shape, until a maximum opening cross-section is reached. Thus, flow disturbances may be compensated for because of a continuously increasing cross-section during the opening process, so that flow losses due to flow disturbances are reduced.

Needless to say, that in a reverse process, that is the closing process, it is also possible to reduce flow losses by means of the truncated cone-shaped outer contour of the cover element, because the flow cross-section is continuously and progressively decreased. Thus, no abrupt closing of the flow cross-section takes place, but the flow cross-section is continuously and evenly decreased by the axial travel of the cover element.

Another advantage of the cone-shaped outer contour of the cover element is to be seen in that, in particular during heating of the cover element, a potential jamming of the cover element in the flow cross-section can be avoided. A portion of the cover element facing in the direction of the flow is subjected to higher temperatures than a portion facing away from the flow. It is therefore advantageous to provide the portion facing the flow with a smaller cone surface diameter than the portion facing away from the flow, so that an expansion in the radial direction of the cover element in the area of the portion facing the flow is possible due to the cone-shaped outer contour.

In an embodiment of the inventive control device, the cover element comprises at least one axial first inflow surface and one axial second inflow surface, wherein the first inflow surface and the second inflow surface are differently formed. The cover element is hollow truncated cone-shaped and, when viewed in the direction of flow, comprises at its end a plate-shaped cone bottom, the outer contour of which at least covers the flow cross-section. At an impact area of the cone bottom facing the flow, at least two inflow surfaces are provided, which are differently formed. This means in other words that the impact surface is formed asymmetrically in such a manner that at least a first inflow surface and a second inflow surface are formed which are formed different from one another. By means of the flow, the first inflow surface and the second inflow surface are subjected to a first radial directional force or a second radial directional force, respectively, which are differently formed because of the different shapes of the inflow surfaces. This means that the cover element may be positioned within its given clearance by means of the directional forces. This positioning causes a positive abutment of the cover element at the casing, in particular in a closed state of the flow cross-section, so that rattling or also so-called clattering is inhibited. The cone bottom is ideally plane or flat, respectively, at its sealing surface facing the casing and abutting the casing in the closed state, so that insensitivity against contamination and wear is achieved.

In another preferred embodiment, the cover element is ideally formed so as to comprise at least one partition wall for separating the first inflow surface and the second inflow surface. This leads to a positive definition of the inflow surfaces and thus to an improved stabilised positioning of the cover element at the casing, so that vibration of the cover element and thus a resulting noise emission are considerably reduced. The sealing surface of the cover element which is formed by the plate-shaped cone bottom is situated with a nearly rectangular deflection of the flow, which is caused by means of a corresponding shape of the inflow surfaces, in a steady flow and is therefore protected from erosion attacks. Furthermore, the pressure energy caused by the deflection of the flow is converted into kinetic energy, so that this kinetic energy is converted into friction and thus into heat. This provides for the additional advantage of the inventive cover element that the heating time of a catalyst which is connected downstream in association with the exhaust gas turbocharger may be considerably reduced so that a reduction of exhaust gas emissions can be achieved. In another advantageous embodiment, an outer surface of the cover element comprises flow-through openings. This means in other words that the truncated cone-shaped outer contour is formed by means of a cone-shaped outer surface which is supported on the cone bottom, wherein flow-through openings are formed completely penetrating this outer surface. Thus, both during opening and during closing of the flow cross-section, a considerably improved flow adjustment corresponding to the size of the flow-through openings can be realized.

In particular, in another embodiment of the inventive control device, one flow-through opening each is formed in the area of an inflow surface, wherein the flow-through opening is formed over a substantial area of a corresponding portion of the cone outer surface in the area of the inflow surface. With this embodiment, an effective, free flow cross-section may be realized which is necessary for achieving an advantageous efficiency of the turbine or the exhaust gas turbocharger, respectively, depending on the axial positioning of the cover element in the bypass duct.

In another embodiment of the inventive control device, the cover element comprises a mounting element for receiving a holding arm of the actuating device, wherein the mounting element is movably accommodated in the holding arm. The cover element is movable within the bypass duct by means of the actuating device. For the connection of the actuating device with the cover element, a mounting element is formed at the cover element, which is rigidly connected with the cover element, which is designed for connecting a holding arm of the actuating device with the cover element. Ideally, the mounting element is not rigidly but movably connected with the holding arm, so that the mounting element and thereby also necessarily the cover element are movable relative to the holding arm and thus to the actuating device. This means in particular, that the cover element can be brought into an ideal position in the bypass duct, which is adapted to the respective flow situation and self-adjusting. In other words, the cover element exhibits a degree of freedom by means of the movable connection between the mounting element and the holding arm, so that it can assume a secure, low-noise position in a self-regulating manner in the bypass duct or at the flow cross-section, respectively, depending on the flow situation.

In an ideal embodiment, the mounting element comprises an elongated hole-shaped mounting opening.

In a special embodiment, the mounting element is formed assembly-friendly partially encompassing the lever arm. The mounting opening is formed quasi groove-type, corresponding to one-sided open slideway, so that the cover element may be hooked into the holding arm by means of the mounting opening. This means that, during the assembly, the actuating device may be installed into the exhaust gas guide section in a first step, subsequently the cover element may be inserted into the exhaust gas guide section, in particular into the flow cross-section of the bypass duct in a second step, and then, in a third and final step, the cover element is attached by means of the mounting element by turning the actuating device at the holding arm of the actuating device thereby realizing controlled movability of the cover element.

It is also particularly advantageous if the cover element can consist of a material different from that of which the actuating device consists. Thus, any suitable material may be used for the cover element. This also means that, due to the loose connection between the cover element and the actuating device, joining methods for making a fixed connection between the cover element and actuating device can be avoided and that non-weldable materials may be used.

In a special embodiment of the inventive control apparatus, the cover element is formed so as to be at least partially abuttable in any position at a duct wall of the bypass duct.

In order to further reduce jamming of the cover element in the bypass duct and in particular in the flow cross-section, the cover element and/or at least partially the actuating device are formed from a ceramic material. The ceramic material exhibits high heat resistance which means that deformations of a component made from ceramic material are small compared to deformations of the component made from metal.

Further advantages, features and details of the invention will become more readily apparent from the following description of preferred exemplary embodiments as well as from the drawing. The features and feature combinations mentioned above in the description as well features and feature combinations indicated in the following description of the figures and/or in the figures alone may be used not only in the indicated combination, but also in other combinations or alone, without departing from the scope of the invention.

DESCRIPTION OF ADVANTAGEOUS EMBODIMENTS

Figure 1:
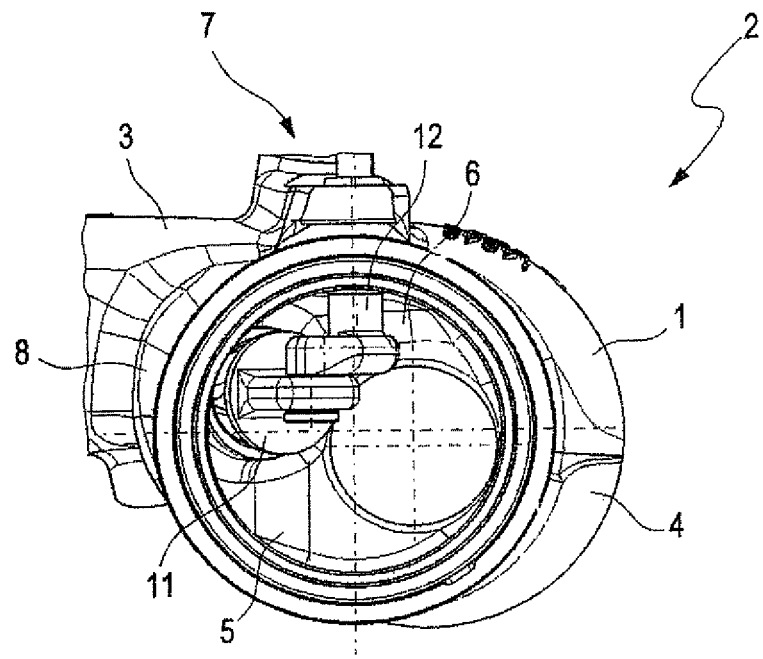
FIG. 1 shows a perspective view of an exhaust gas guide section for a turbine with an inventive control device.

An exhaust gas inlet flow guide section 1 of a turbine 2, as shown in FIG. 1, in particular of a turbine of an exhaust gas turbocharger, comprises an inlet duct 3 for a fluid flow entering the exhaust gas guide section 1, generally exhaust gas of a combustion engine, a spiral duct 4 downstream of the inlet duct 3 for conditioning of the flow and an outlet duct 5 downstream of the spiral duct 4, via which the exhaust gas from the exhaust gas guide section 1 is discharged in a controlled manner. Between the spiral duct 4 and the outlet duct 5, a wheel chamber 6 is formed in which a turbine wheel (not shown in detail) is rotatably accommodated.

For matching the operating behavior of the turbine 2 with the fluid flow, a control apparatus 7 for opening or closing a turbine bypass duct 8 is provided in the flow-through exhaust gas guide section 1 for bypassing the wheel chamber 6 in the exhaust gas guide section 1. The turbine bypass duct 8 comprises an inlet opening 9 with a flow cross-section 10, wherein the inlet opening 9 may be completely or partially closed by means of a control device 7 or completely or partially opened, respectively. According to the positioning of the control device 7, it is possible that the fluid flow completely or partially flows into the wheel chamber 6 and thus into the turbine wheel which is rotatably accommodated in the wheel chamber 6 or completely or only partially, respectively, bypasses the turbine wheel.

A cover element 11 of the control device 7 is movably accommodated in the turbine bypass duct 8, and thus in the exhaust gas guide section 1, wherein the cover element 11 in the bypass duct for opening or closing of the flow cross-section 10 is supported over the full length of the cover element travel distance from a closed to a fully open position so as to perform an essentially translatory motion for adjusting the now cross-section 10 of the inlet opening 9.

For the translatory motion of the cover element 11, the inventive control device 7 comprises an actuating device 12 in the form of a pivot lever.

For opening or closing of the flow cross-section 10, the cover element 11 is principally in the form of a hollow truncated cone. This means in other words that an outer surface 13 of the cover element 11 is truncated cone-shaped, wherein the truncated cone is designed hollow by means of the outer surface 13, similar to a hollow cylinder. At an end of the cover element 11, when viewed in the flow direction, a cone bottom plate 15 is formed at the cover element 11, wherein the cone bottom plate 15 has a larger outer diameter than the largest outer diameter of the outer surface 13. This provides a sealing surface 16 which in a closing position of the cover element 11, i. e. in a position of the cover element 11, in which the bypass duct 8 is completely closed, is in flow-tight contact with the exhaust gas guide section 1. The cone bottom 15 comprises an impact surface 17 at its side facing the outer surface 13, into which the fluid flow may flow. In an exemplary embodiment (not shown in detail), the impact surface 17 is formed completely flat.

The outer surface 13 comprises flow-through openings 14 which are formed so as to completely penetrate the outer surface 13. This simplest exemplary embodiment of the cover element is not shown in detail herein.

The impact surface 17 of the cover element 11 according to FIGS. 1 to 11 is formed to exhibit three inflow areas with a first inflow surface 18, a second inflow surface 18' and a third inflow surface 18". In each of the areas of inflow surfaces 13, 18', 18" a flow-through opening 14 each is formed. The outer surface 13 is largely penetrated by the flow-through openings 14 which are so large that the outer surface portions 19, 19', 19" of the outer surface portions 19, 19', 19" of the outer surfaces 13 in the area of the inflow surfaces 18, 18', 18" is which extend into the bypass dud 8 so as to guide the cover element over the full length of the cover element travel distance from a closed to a fully open position are relatively narrow. This is advantageous in that, with increasing opening of the flow cross-section 10 by means of the flow-through opening 14, a progressively increasing flow area is provided, or that, with decreasing opening of the flow cross-section 10 during a closing operation by means of the flow-through opening 14, a progressively decreasing flow area is provided.

In the cover element 11 shown in FIGS. 1 to 11 the cone bottom 15 and the impact surface 17 or its inflow surfaces 18, 18', 18", respectively, are completely separated from each other by means of partition walls 20, that is, there is a first partition wall 20, a second partition wall 20 and a third partition wall 20. Each of the inflow surfaces 18 has a unique contour, i. e. none of the three inflow surfaces 18 is identical. Thus, the partition walls 20 allow a considerably improved design of the characteristic incident fluid flow for the relevant inflow surface 18, 18', 18" because mixing of the incoming flows is essentially prevented by means of the partition walls 20.

Figure 2:
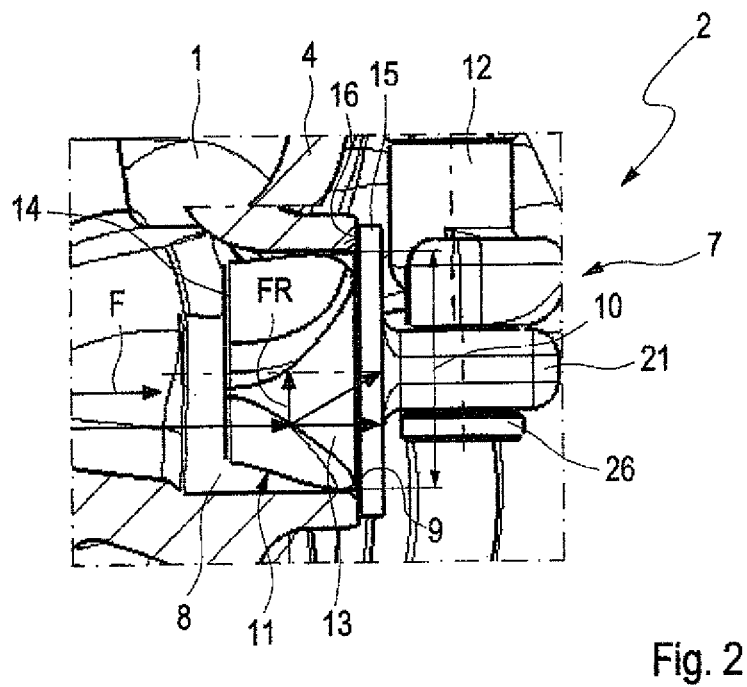
FIG. 2 shows a partial section through the exhaust gas guide section according to FIG. 1.
Figure 3:
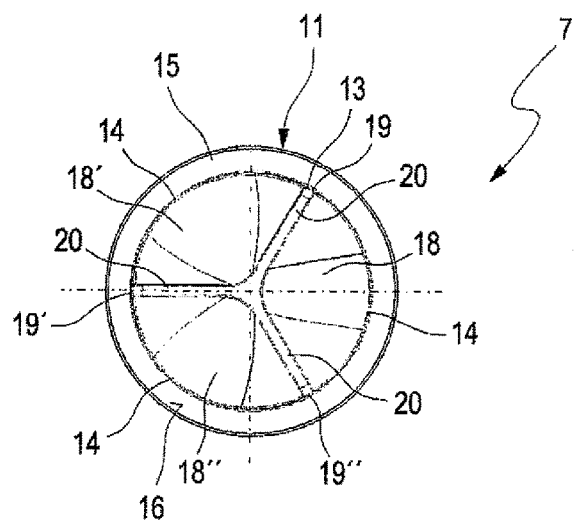
FIG. 3 shows a plan view of a cover element of the inventive control device.
Figure 4:
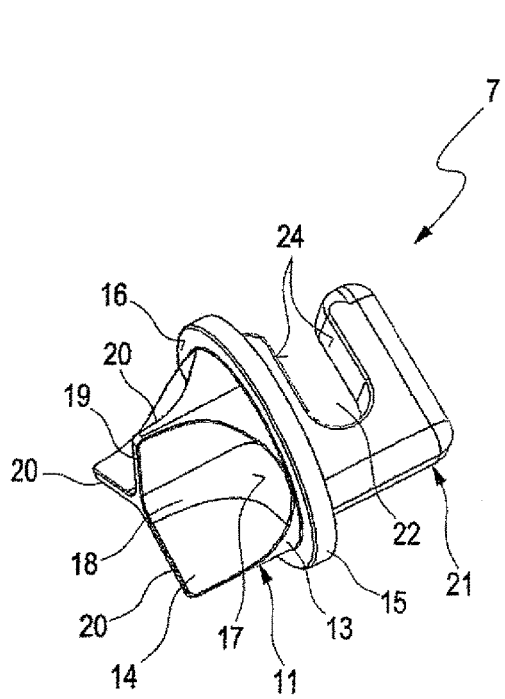
FIG. 4 shows a perspective view of the cover element of the inventive control device.
Figure 5:
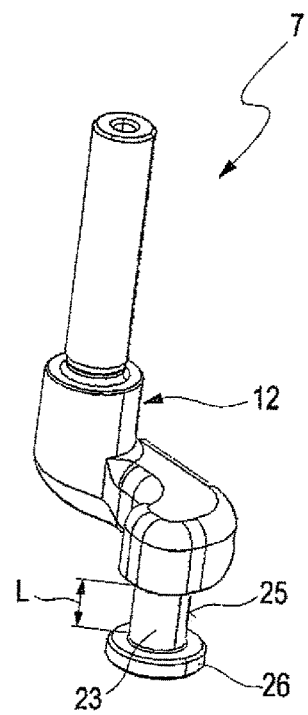
FIG. 5 shows a perspective view of an actuating device of the inventive control device.
Figure 6:
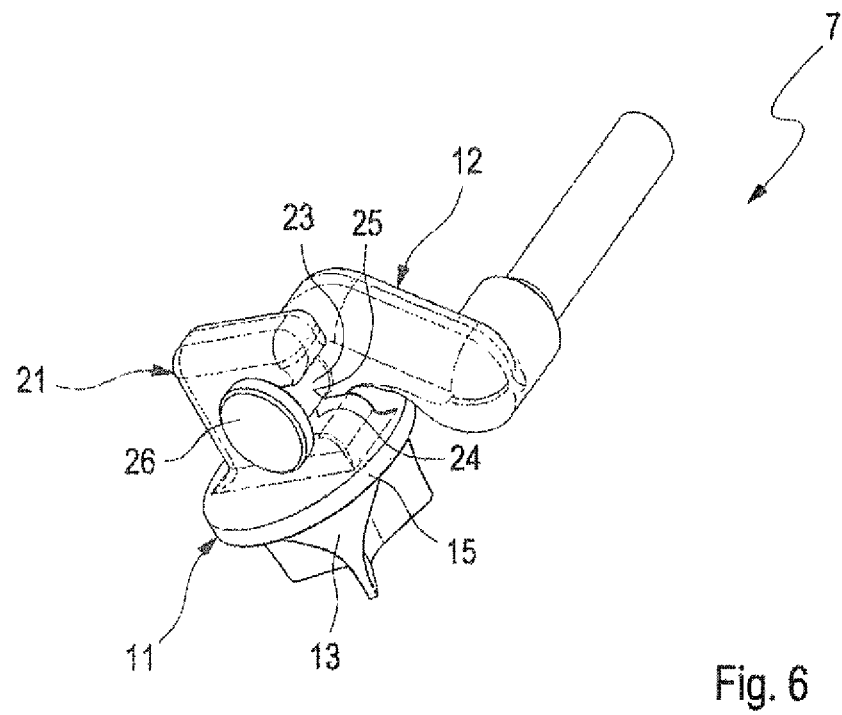
FIG. 6 shows a perspective view of the cover element assembled with the actuating device.
Figure 7:
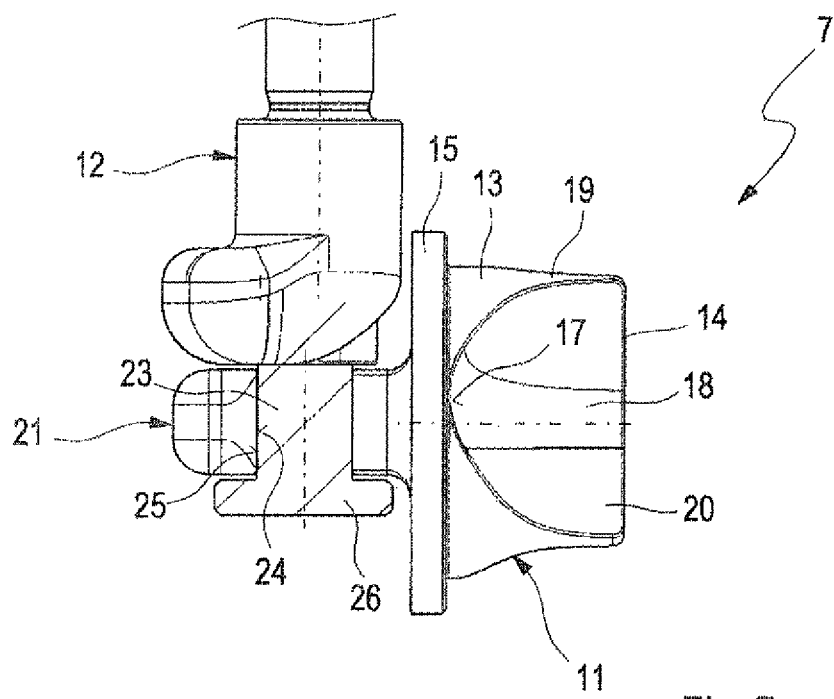
FIG. 7 shows a partial section through the inventive control device.
Figure 9:
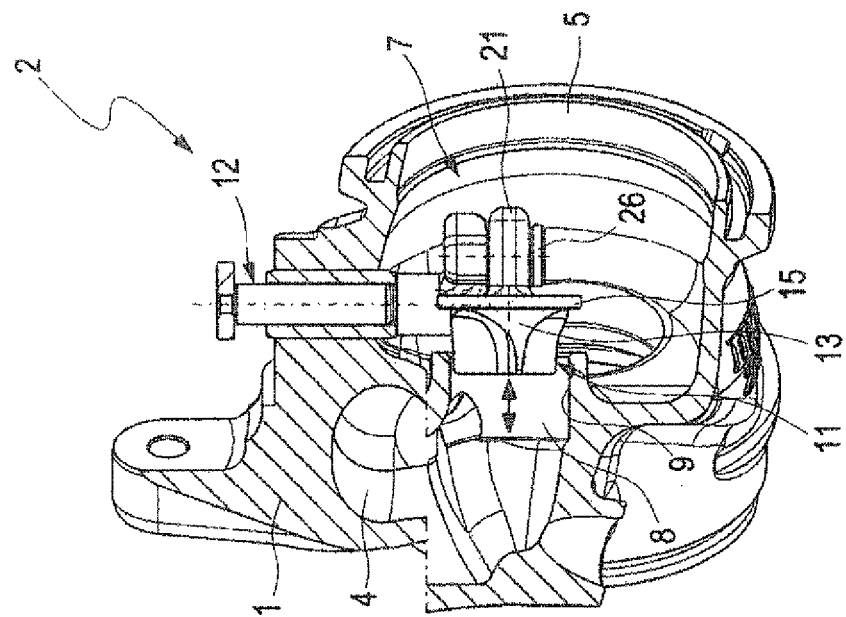
FIG. 9 shows a partial section of the exhaust gas guide section according to FIG. 1, with the cover element in the open position.
Figure 8:
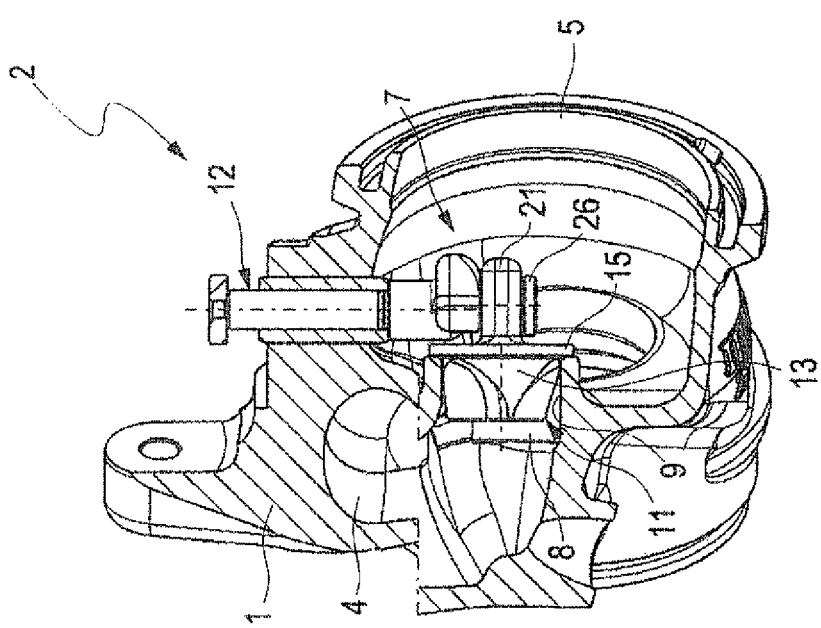
FIG. 8 shows a partial section of the exhaust gas guide section according to FIG. 1, with the cover element in the closed position.
Figure 10:
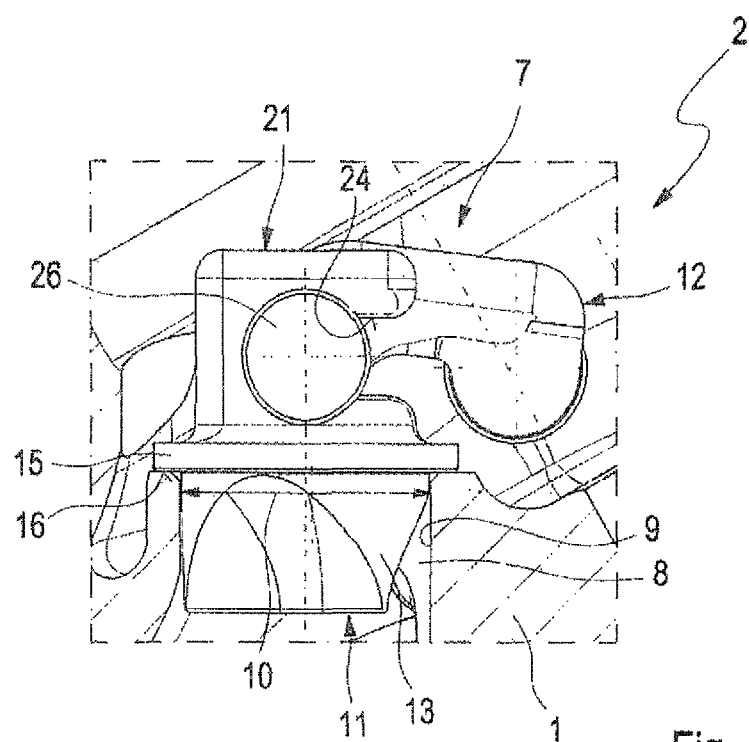
FIG. 10 shows another partial section of the exhaust gas guide section according to FIG. 8.

FIG. 2 shows an exemplary parallelogram of forces of a force F which is imparted by the fluid flow on the cover element 11, or on the relevant inflow surface 18, 18', 18", respectively. A directional force FR is generated which has a resultant value corresponding to the respective contour of the inflow surface 18, 18', 18". With each inflow surface 18, 18', 18" generating a directional force FR, and the contours of the inflow surfaces 18, 18', 18" being different from each other, a specific directional overall force FR is formed which accordingly positions the cover element 11 in the flow cross-section 10 or in the bypass duct 8, respectively. When the flow cross-section 10 is closed, a defined abutment of the outer surface 13 of the cover element 11 against a duct wall of the bypass duct 8 of the exhaust gas guide section 1 is achieved. This results in at least a reduction of rattling or clattering, because the cover element 11 is no longer indirectly subjected to various flow conditions, as is the case even at a constant operating point of a combustion engine connected with the turbine 2 due to pressure pulsation by opening and closing of the engine outlet valves and the associated exhaust gas shock waves in the exhaust gas guide section 1.

For permitting positioning of the cover element 11 depending on the fluid flow, the cover element 11 comprises a mounting element 21 at the side of the cone bottom 15, which faces away from the flow cross-section 10.

The mounting element 21 is formed U-shaped, i. e. the mounting element 21 comprises a so-called elongated hole which is open on one side. In other words, an elongated hole-shaped mounting element opening 22 is formed in the mounting element 21. Corresponding to this, at the end of the actuating device 12 which faces the cover element 11, a holding arm 23 is formed, which is accommodated by the mounting element 21 in its mounting element opening 22. A so-called slideway is formed between a first sliding surface 24, a surface of the mounting element opening 22 and a second sliding surface 25 which is formed at the holding arm 23 in the form of its surface. This means, upon opening and closing of the flow cross-section 10, the second sliding surface 25 rolls off on the first sliding surface 24 so that a translatory motion of the cover element 11 in the bypass duct 8 is effected. Advantageously, the holding arm 23 is designed in such a manner that the diameter of the holding arm 23 is variable over its axial length L. The holding arm 23 has e. g. a cone-shaped outer contour. For the secure accommodation of the mounting element 21, a locking element 26 in the form of a washer is formed at the end of the holding arm 23. The holding arm 23 configured in this manner is advantageous in that no further joining method, e. g. riveting is required for the secure connection of the cover element 11 with the actuating device 12 because, due to the cone-shaped outer contour of the holding arm 23, the cover element 11 is locked against rotation.

Figure 11:
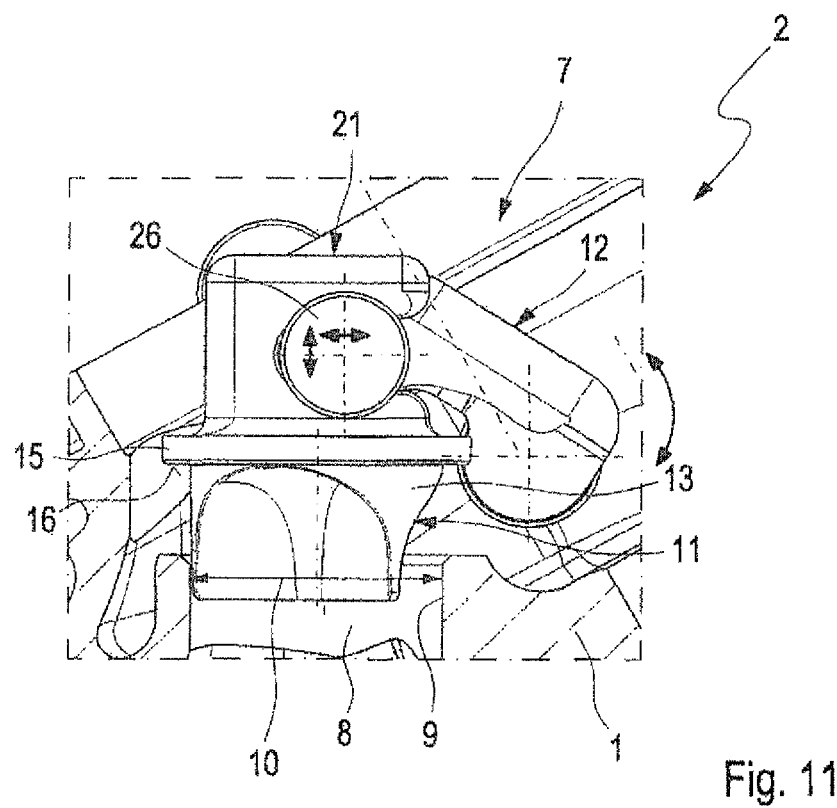
FIG. 11 shows still another partial section of the exhaust gas guide section according to FIG. 9.

In FIG. 11, motion arrows of the cover element 11 and the actuating device 12 are drawn for the visualization of possible directions of motions of the inventive control device.

It is noted that the cover element 11 and/or at least partially also the actuating device 12 consist of a ceramic material.

What is claimed is:

1. A flow control device for an exhaust gas guide section (1) of a turbine provided for opening and closing a turbine bypass duct (8) with a bypass opening (9) having a flow cross-section (10) arranged in the exhaust gas guide section (1) for bypassing a turbine wheel rotatably disposed in a wheel chamber (6) of the exhaust gas guide section (1), the flow control device comprising an actuating device (12) engaging a cover element (11) for opening or closing the flow cross-section (10) of the bypass duct (8) by linear motion of the cover element (11), the cover element (11) being at one side in the form of a truncated cone with flow guide passages formed in the cover element (11) by at least three circumferentially equally spaced partition walls (20) forming separate inflow areas (18, 18', 18") and having narrow outer surface portions (19, 19', 19") extending into the bypass duct (8) so as to abut adjacent wall areas of the turbine bypass duct (8) for guiding the cover element (11) over the full length of the travel distance of the cover element (11) from the closed to the fully open position of the cover element (11) to provide for the linear motion of the cover element (11) in the turbine bypass duct (8) and defining the separate inflow guide areas (18, 18', 18") in the cover element (11), and the opposite side having a mounting element (21) including an elongated transverse opening (22) with opposite slide surfaces (24), and the actuating device (12) in the form of a pivot lever having a holding arm (23) received in the elongated transverse opening (22) for actuating the cover element (11) by pivotal movement of the actuating device (12).

2. The flow control device according to claim 1, wherein the partition walls (20) separating the inflow areas (18, 18', 18") from one another have between the partition walls (20) flow guide surfaces (17) which are shaped so as to reduce flow resistance through the flow control device.

3. The flow control device according to claim 1, wherein the mounting element (21) is formed so as to partially encompass the holding arm (23).

4. The flow control device according to claim 1, wherein et least one of the cover element (11) and the actuating device (12) consist at least partially of a ceramic material.

5. The flow control arrangement according to claim 1, with the cover element (11) comprising at least a first inflow guide area (18) and a second inflow guide area (18') wherein the first inflow guide area (18) and the second inflow guide area (18') are formed differently from one another as to generate a directional side force (FR) on the cover element (11) which biases the cover element (11) against an adjacent duct wall area, in order to avoid rattling of the cover element (11) during operation.

\* \* \* \* \*